C. ALBRECHT.
LINOTYPE MACHINE.
APPLICATION FILED JUNE 14, 1907.
919,805.
Patented Apr. 27, 1909.
2 SHEETS—SHEET 1.
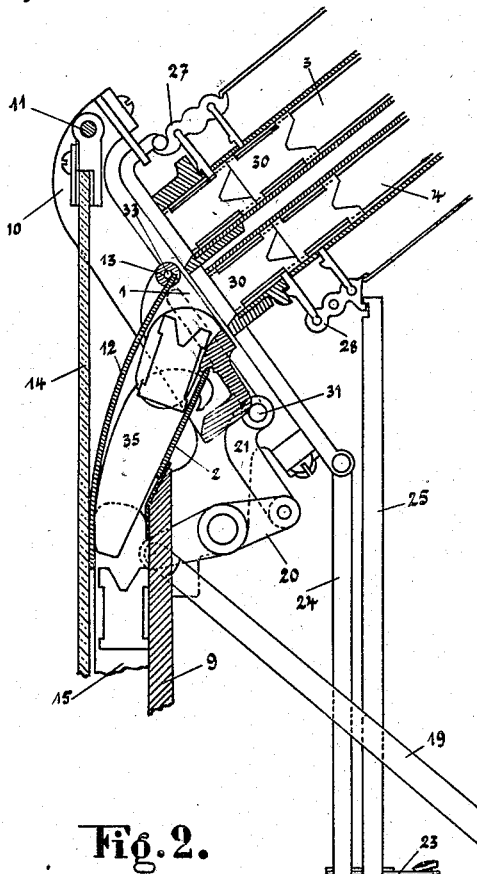
Fig. 1.
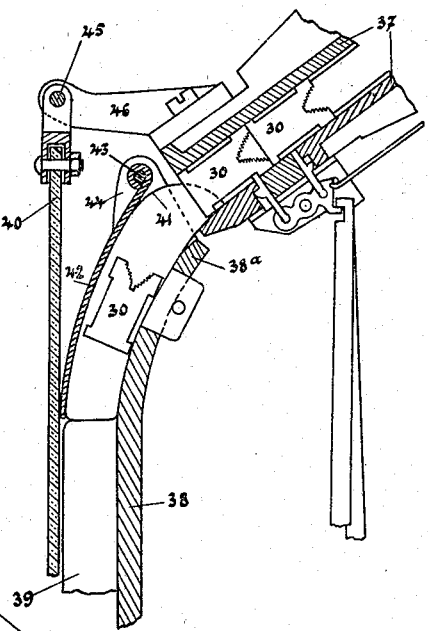
Fig. 2.
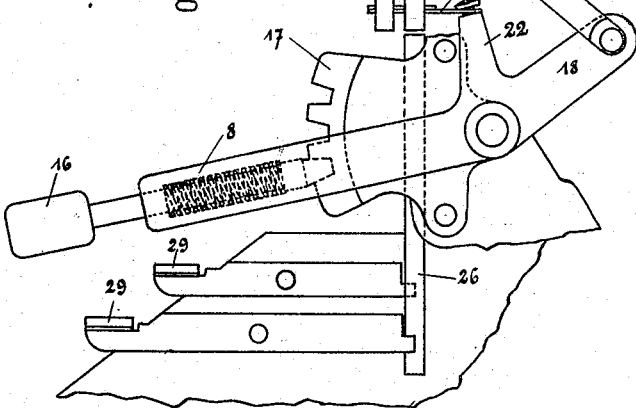
WITNESSES:
W. M. Avery
INVENTOR
Christian Albrecht
BY Munn & Co.
ATTORNEYS C. ALBRECHT.
LINOTYPE MACHINE.
APPLICATION FILED JUNE 14, 1907.
919,805.
Patented Apr. 27, 1909.
2 SHEETS—SHEET 2.
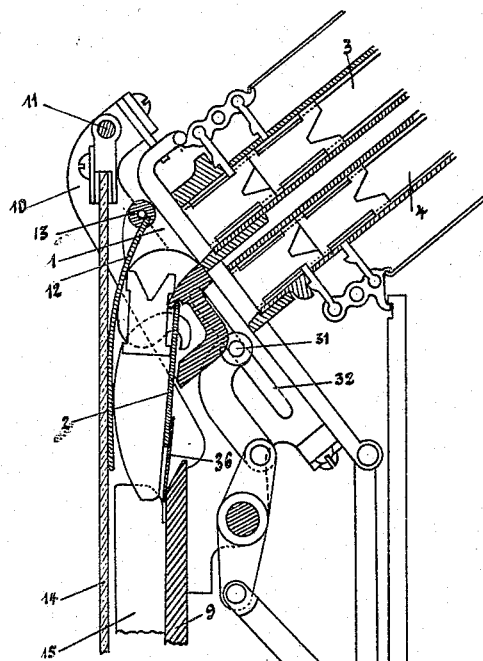
Fig. 4.
Fig. 3.
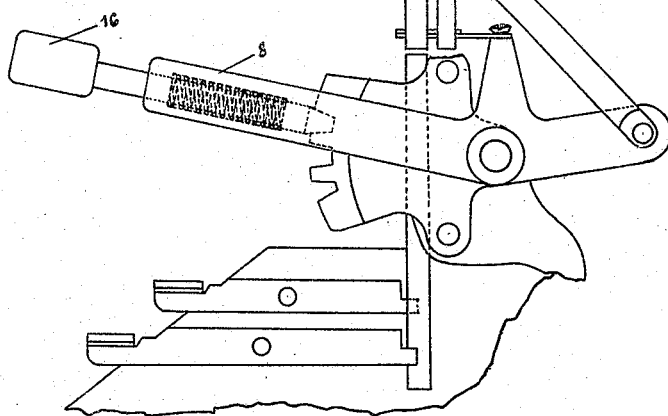
WITNESSES:
W. M. Avery
INVENTOR
Christian Albrecht
BY Munn & Co.
ATTORNEYS

UNITED STATES PATENT OFFICE.

CHRISTIAN ALBRECHT, OF CHARLOTTENBURG, GERMANY.

LINOTYPE-MACHINE.

No. 919,805.  Specification of Letters Patent.  Patented April 27, 1909.

Application filed June 14, 1907. Serial No. 379,082.

*To all whom it may concern:*

Be it known that I, CHRISTIAN ALBRECHT, a citizen of the United States of America, residing at 25 Waitzstrasse, Charlottenburg, near Berlin, in the Empire of Germany, have invented certain new and useful Improvements in Linotype-Machines, of which the following is a specification.

One object of my invention is to provide means for reducing the wear and tear on the lugs of the matrices as they leave their magazine and enter the vertical channels. Hitherto the matrices leaving their magazine would strike more or less violently against the vertical glass plate, which in general covers a portion of the front of the machine and the delivery mouths of the magazine or magazines, whereby in time the wear and tear on the lugs of the matrices would become considerable. This wear and tear is reduced, in accordance with the present invention, by providing a flexible or curved cover of celluloid or other elastic material in front of the part or chute between the delivery mouth of the magazine and the vertical channels in such a way that the matrices will strike the flexible or curved cover and be guided thereby as they leave their magazine. Where a plurality of magazines are provided, the part or chute between the delivery mouths of the magazines and the vertical channels is made movable and the flexible cover is mounted so as to move with the movable chute, and when the movable chute is in front of the lower magazine, the flexible cover serves for preventing the passage to the assembling mechanism of any matrices which are accidentally discharged from the upper magazine or magazines. Moreover by the provision of the flexible cover, which is bent or curved so as to properly guide the matrices, the front glass plate may be made straight instead of curved as hitherto.

Another object of the present invention is to improve upon the construction of the part or chute between the delivery mouth of the magazine and the vertical channels, particularly in machines designed for a plurality of magazines and where, therefore, the said part or chute is made movable. In accordance with the invention the movable chute is constructed in two parts, one of which is adapted to slide in front of the delivery mouths of the magazines while the other part is mounted below the sliding part and is adapted to swing so as to deliver properly the matrices into the vertical channels below.

I will now proceed to describe my invention with reference to the accompanying drawings, in which—

Figure 1 is a vertical section from front to rear through the upper part of the front glass plate, the chute and the lower end part of a single magazine, Fig. 2 is a view partly in elevation and partly in vertical section of a sufficient portion of the composing mechanism of a linotype-machine with two superposed magazines to enable the invention to be understood, Fig. 3 is a similar view with the parts in the other extreme position, and Fig. 4 is a detail sectional view, showing the construction of the movable chute in Figs. 2 and 3.

Similar characters of reference refer to similar parts throughout the several views.

In Fig. 1 I have shown parts of a known Mergenthaler linotype-machine with a single magazine 37. I may bend the upper part of the back plate 38 rearwardly in the manner clearly shown, so as to facilitate the turning of the matrices 30, 30 during their passage from the magazine 37 to the known vertical channels, which latter are formed by the back plate 38, the ribs 39 thereon and the front glass plate 40. On the curved upper part 38ª of the back plate 38 ribs 41 in line with those 39 below may be provided in any known manner for better guiding the matrices 30, 30. The chute formed by the upper part 38ª and the ribs 41 is according to my invention closed with a flexible or curved cover 42 of elastic material, such as celluloid or the like. Preferably I hinge the cover 42 with its upper edge at 43 to convenient supports 44 provided on the back plate 38 or the machine frame. Then the cover 42 can be readily turned upward if required, and when turned downward it will be pressed on the ribs 41 by the glass plate 40 against which it may bear. The glass plate 40 may be hinged at 45 to convenient arms 46 on the magazine 37 or on the machine frame as usual.

From an inspection of Fig. 1 it will be clear, that the matrices 30, 30 on being discharged from the magazine 37 will strike the elastic cover 42 instead of the hard glass plate 40 as hitherto. Thereby the blow of each matrix 30 will be softened, so that its lugs are protected from excessive wear and tear. With this construction the front glass plate 40 is permitted to be made straight instead of bent at its upper part as is sometimes the case.

In linotype-machines with more than one magazine the chute between the delivery mouths of the magazines and the vertical channels requires to be made movable, as is for example shown at Figs. 2 and 3 which illustrate a linotype-machine with two superposed magazines 3 and 4. Here the movable chute is made of two parts 1 and 2, see Fig. 4, of which the upper part 1 is guided in suitable arms 10 of the machine frame, its pivots 31 engaging in slots 32 of the arms 10 and its pins 33 sliding on the upper surfaces of these arms. Thus the movable chute is guided in front of the delivery mouths of the magazines 3 and 4 in a direction at right angles to their upper surfaces.

On the key board an adjusting lever 8 provided with a spring-pressed bolt 16 engaging in any one of the notches of a stationary segment 17 can be brought into an upper extreme position shown in Fig. 3 or into a lower extreme position, see Fig. 2, so that by its rear arm 18, the rod 19, the two-armed lever 20 and the link 21 the movable chute can be moved into its upper or lower position respectively. The adjusting lever 8 is adapted to shift by means of its upper arm 22 and the connection 23 either of the two rows of upper operating rods 24 and 25 into engagement with the lower operating rods 26, so that the escapement levers 27 or 28 may be actuated from the finger-keys 29 in the known manner for delivering the respective matrices 30. Of the known assembling mechanism only the vertical back plate 9 with the vertical ribs 15 and the hinged glass plate 14 suspended at 11 from the arms 10 are shown.

The lower part 2 of the movable chute (see Fig. 4) engages with its upper edge in a longitudinal groove or recess in the upper part 1 and is thus pivotally connected with the latter by means of suitable helical springs 7, these springs passing freely through corresponding recesses in the upper part 1, as is clearly shown in Fig. 4. The upper part 1 is provided with a row of vertical ribs 34 secured on it in any known manner, so that between the several ribs 34 channels are formed for guiding the matrices 30 delivered from the respective magazine 3 or 4. In a similar manner the lower part 2 is provided with a row of vertical ribs 35 secured on it in any known manner. The ribs 34 of the upper part 1 are made to overlap the ribs 35 of the lower part 2, as is shown in Fig. 4, and the lower ends of the ribs 35 are in turn made to overlap the upper ends of the vertical ribs 15 on the back plate 9. A thin plate 36 of elastic material, such as celluloid or the like, is preferably fastened on the rear of the lower part 2 at its lower edge and is adapted to slide on the upper beveled-off edge of the back plate 9, as is clearly shown in Figs. 2 and 3. Thereby the matrices 30 are prevented from striking the upper edge of the back plate 9 and blocking up the vertical channels. The movable chute is provided with the flexible cover 12 of celluloid or the like, which is suspended from the upper part 1 at 33. This cover 12 will rest on the front edges of the several ribs 34, 35 and 15 and will bear on the glass plate 14. There is sufficient space left between the glass plate 14 and the front edges of the vertical ribs 15 to permit the cover 12 to engage between them, see Fig. 2. The upper edges of the vertical ribs 15 are rounded off on the front and on the rear, so that on the one hand the cover 12 can easily engage in the said space and on the other hand the lower edge of the elastic plate 36 can engage between the ribs 15 and the back plate 9, if the movable chute occupies its lower position, as is shown in Fig. 2.

From an examination of Figs. 2 and 3 it will be evident, that during the shifting of the chute by means of the adjusting lever 8 the flexible cover 12 will adjust itself to the ribs 34 and 35 of the two parts 1 and 2 and to the glass plate 14, so that for any position of the chute a series of bent channels will be formed for guiding the matrices 30 during their passage from the magazine 4 or 3 to the vertical channels. As the cover 12 is elastic the front upper lugs of the matrices 30 striking it will be protected from excessive wear, the same as before described with reference to Fig. 1. The cover 12 further presents the important advantage, that it catches all matrices delivered by mistake from the upper magazine 3 in case the chute occupies its lower position shown in Fig. 2. Thus the said matrices are prevented from getting into the assembling part of the machine and can be easily removed by merely turning upward the glass plate 14.

It will be understood that various changes may be made in the constructions shown and described without departing from the spirit of my invention.

I claim:

1. In a linotype-machine, the combination with a chute between the delivery mouth of the magazine and the vertical channels, of a front plate, and a flexible cover between said chute and said front plate.

2. In a linotype-machine, the combination with a chute between the delivery mouth of the magazine and the vertical channels, of a straight front plate, and a curved flexible cover between said front plate and said chute.

3. In a linotype-machine, the combination with a plurality of magazines, of a two-part movable chute, one part of said chute being adapted to slide in front of the delivery mouths of said magazines and the other part to swing below the sliding part.

4. In a linotype-machine, the combination with a plurality of magazines, of a two-part movable chute, one part of said chute being adapted to slide in front of the delivery mouths of said magazines and the other part being hinged to the sliding part.

5. In a linotype-machine, the combination with a plurality of magazines, of a two-part movable chute between said magazines and the vertical channels, one part of said chute being slidable in front of the delivery mouths of said magazines and the other part being adapted to swing on the sliding part in order to deliver the matrices into the vertical channels.

6. In a linotype-machine, the combination with a plurality of magazines, of a two-part movable chute, one part of said chute being adapted to slide in front of the delivery mouths of the magazines and the other part being adapted to swing on the sliding part and being provided with a flexible plate at its lower end.

7. In a linotype-machine, the combination with a plurality of magazines, of a movable chute between the delivery mouths of said magazines and the vertical channels and having two parts, of which the upper part has a recess and the lower part is rounded to fit the recess, and springs connecting the two parts of said chute.

8. In a linotype-machine, the combination with a plurality of magazines, of a two-part chute in front of the delivery mouths of said magazines, and a flexible cover on said two-part chute and adapted to guide the matrices.

9. In a linotype-machine, the combination with a plurality of magazines, of the vertical channels, a two-part movable chute of which one part is adapted to slide in front of the delivery mouths of said magazines and the other part to swing on the first named part and to deliver the matrices into said vertical channels, and a flexible cover on said two-part movable chute for guiding the matrices.

10. In a linotype-machine, the combination with a chute between the delivery mouth of the magazine and the vertical channels, of a front plate, and a flexible cover hinged at its upper end, and extending between said chute and said front plate.

11. In a linotype-machine, the combination with a chute between the delivery mouth of the magazine and the vertical channels, of a straight front plate, and a curved cover between said front plate and said chute, the said cover being hinged at its upper end.

12. In a linotype-machine, the combination with a chute between the delivery mouth of the magazine and the vertical channels, of a straight front plate, and a curved flexible cover between said front plate and said chute, the said flexible cover being hinged at its upper end.

13. In a linotype-machine, the combination with a plurality of magazines, of a two-part movable chute in front of the delivery mouths of said magazines, and a cover hinged at its upper end on said two part movable chute and adapted to guide the matrices.

14. In a linotype-machine, the combination with a plurality of magazines, of the vertical channels, a two-part movable chute of which the upper part is adapted to slide in front of the delivery mouths of said magazines and the lower part to swing on said upper part and to deliver the matrices into said vertical channels, and a cover suspended from the upper part of said two-part movable chute for guiding the matrices.

15. In a linotype-machine, the combination with a plurality of magazines and the vertical channels, of a two part movable chute between said magazines and the vertical channels, one part of said chute being slidable in front of the delivery mouths of said magazines and the other part being adapted to swing on the sliding part, a front plate, and a cover on the chute and extending between the chute and the said front plate.

CHRISTIAN ALBRECHT.

Witnesses:
 HENRY HASPER,
 WOLDEMAR HAUPT.